No. 822,087. PATENTED MAY 29, 1906.
F. C. W. TIMM.
PROCESS FOR DISSOLVING SOLID FLUXES IN FLUID SLAG.
APPLICATION FILED JULY 24, 1905.
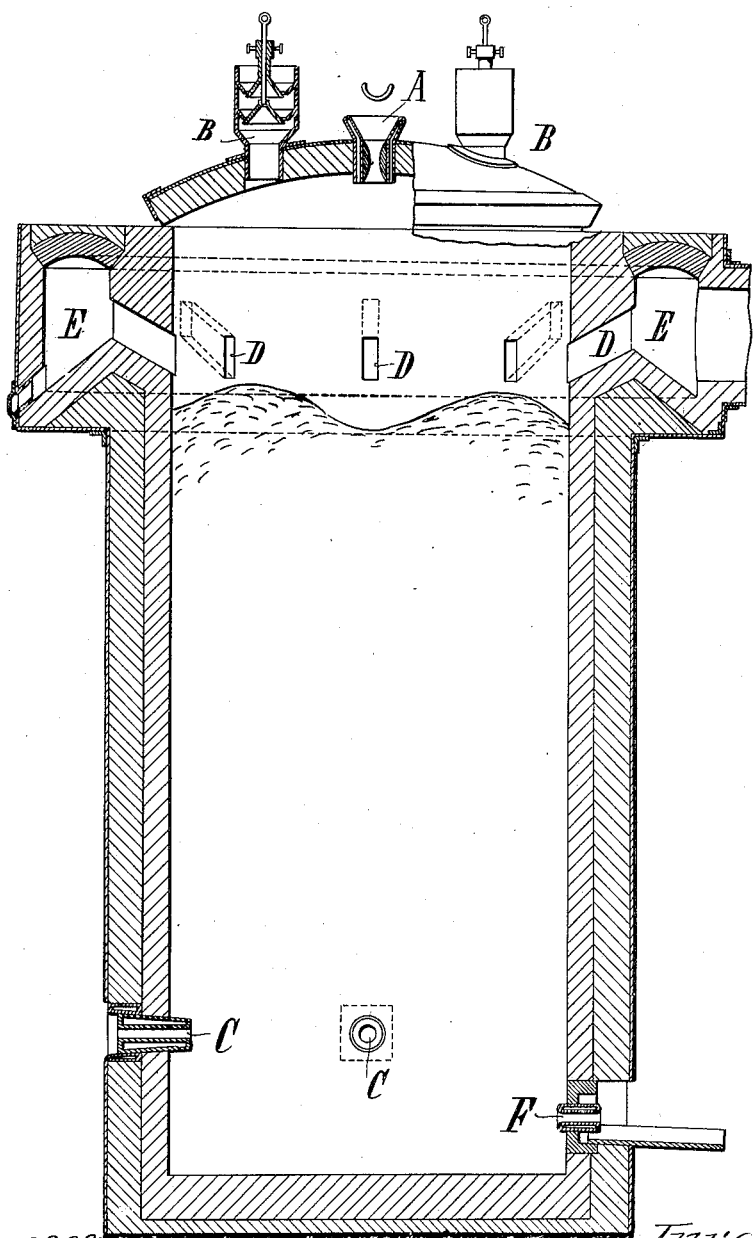
Witnesses: Inventor
Friedrich C. W. Timm
By
James L. Norris

UNITED STATES PATENT OFFICE.

FRIEDRICH CARL WILHELM TIMM, OF HAMBURG, GERMANY.

PROCESS FOR DISSOLVING SOLID FLUXES IN FLUID SLAG.

No. 822,087.     Specification of Letters Patent.     Patented May 29, 1906.

Application filed July 24, 1905. Serial No. 271,034.

*To all whom it may concern:*

Be it known that I, FRIEDRICH CARL WILHELM TIMM, engineer, residing at 15 Elisenstrasse, Hamburg, in the German Empire, have invented certain new and useful Improvements in Processes for Dissolving Solid Fluxes in Fluid Slag, of which the following is a clear and distinct description.

In preparing blast-furnace slag for the manufacture of cement, mineral wool, glass, building-stones, and the like it is either absolutely necessary that the admixture added to the blast-furnace slag—for instance, lime, pyrolusite, ferric oxid, silicic acid, alkali, and the like—should dissolve homogeneously, or it is at least very desirable that it shall do so, as the resulting product will then be of much superior quality.

Almost every process by means of which it has been proposed to secure a homogeneous solution of the admixture added to the slag is very expensive. The only apparent exception in which fluxes broken into small pieces or ground to powder are simply stirred into slag heated to a very high temperature, and consequently fluid, does not produce a homogeneous solution, but only a mechanical mixture, which can only be rendered homogeneous by being again smelted, (*vide* the specification of the English Patent No. 14,010, 1884, among others.) This process, however, is quite as expensive as when a mixture of cold broken-up slag and large pieces of cold flux are directly fused in the blast-furnace. The costly character of all these processes is due partly to the use of broken-up—that is, cold—slag, which of course has lost all the fusing heat inherent in it, and partly to the fact that the operation is effected in hearths the employment of which on account of the large amount of fuel consumed, the frequent repairs, and the supervision required, is in any case more expensive than the employment of blast-furnaces, (*vide* the specification of the English Patent No. 22,004 of 1892.) Similar objections apply also to the process described in the specification of the German Patent No. 132,681, in which the lime flux, to which a small quantity of the costly alkali has been added, is first turned, by means of a separate operation, into a soluble frit and then, by means of a second operation, fused with the slag.

The process to which this invention relates is distinguished from the processes referred to above by making use of slag at a very high temperature, and consequently of a very fluid condition, to which pieces of flux are added, which are heated, and consequently are homogeneously dissolved.

A further advantage consists in the simplicity and great working capacity of the devices employed to carry out the invention.

In the accompanying drawing is shown one constructional form of carrying out the invention.

The apparatus employed consists of a blast-furnace into which slag is fed by means of a funnel A. Flux and coke are introduced into the furnace by means of the hopper B, provided with double cones, as shown. Blast-air for heating the coke enters at C. The gaseous products of the combustion process while ascending the furnace raise the flux to a high temperature and escape by way of the passage D first into the circular canal E and from thence either into a chimney or into the outer air after having been employed, if desired, for heating a boiler or for drying or similar purposes.

The contents of the furnace—that is to say, the pieces of flux and coke—are thoroughly incandescent. The fluid slag fed into it distributes itself as a fine shower between the individual pieces, which act after the manner of a filter, dissolves the flux, and leaves the apparatus at F in the form of a homogeneous enriched fluid mass. As the process continues the diameter of the pieces of flux becomes smaller and smaller the more nearly they sink into the neighborhood of the twyers C. The coke is consumed, and as the contents of the furnace become by degrees less fresh quantities of flux and coke are added.

The downward movement of the contents of the furnace and the distribution of the slag between the different pieces of flux and coke, acting as a filter, results in the complete assimilation of the pieces of flux when somewhere in the vicinity of the twyers C. The composition of the mixture of flux and coke fed into the furnace must be regulated accordingly.

The flux mostly used in the manufacture of cement is lime; but ferric oxid, pyrolusite, compounds of an alkaline metal, and the like may also be employed. The nature and the quantities of the flux employed depend on the character of the slag to which it is to be added and which varies with the pig-iron from which it results. It depends likewise on the demands made on the particular product in the manufacture of which the slag is to be employed—such, for instance, as cement, or other hydraulic binding media, glass, mineral wool, paving stones, and the like; but notwithstanding the whole process is an extremely simple one and it is rendered possible by means of it to produce materials at a much reduced cost than would have been possible by means of any other process heretofore in use.

Other varieties of slag than blast-furnace slag—for instance, Thomas slag, obtained from the basic process, as well as artificial fusings—can be treated in the same manner. It is, moreover, not absolutely necessary to introduce the fuel, coke, or coal at the same time and in the same manner as the flux. If desired, the requisite temperature may be obtained by using liquid, gaseous, or powdered fuel introduced from below together with the blast-air.

Under certain conditions a still more satisfactory result may be obtained if the pieces of flux permeated by the fluid slag besides being dissolved are, moreover, fused together. For instance, if the slag is to be enriched with silicic acid and ferric oxid and if the furnace is supplied in the manner described above with the necessary mixture of the just-mentioned fluxes and coke, then the combustion of the coke will bring about, when the mass arrives in the vicinity of the twyers, an intimate intermingling of the two kinds of the flux mentioned above, resulting in an easily-fluxing fused mass of silicic acid and ferric acid, which becomes mixed with the slag, which has been enriched by filtering through the contents of the furnace; but such a smelting together of the fluxes is but a secondary effect. The enrichment is principally effected by causing the fluid slag to distribute itself as a fine shower between the heated pieces of flux. Moreover, the fluxes may only be smelted if their acid and basic components are correspondingly constituted. Therefore an exclusive enrichment in lime can only be effected by the solution in fluid slag, the flux (lime) being infusible.

Having now particularly described and ascertained the nature of my said invention and in what manner the same is to be performed, I declare that what I claim is—

A process of preparing blast-furnace slags for the manufacture of cement, mineral wool, glass, building-stone and the like, consisting in piling up a suitable flux within a furnace and then passing simultaneously through said flux, fluid slag and heating-gases.

In testimony whereof I have hereunto set my hand in presence of two subscribing witnesses.

FRIEDRICH CARL WILHELM TIMM.

Witnesses:
  OTTO W. HELLMRICH,
  IDA CHRIST. HAFERMANN.